United States Patent
Jin et al.

(10) Patent No.: US 9,956,536 B2
(45) Date of Patent: May 1, 2018

(54) TRIPLE-RESPONSIVE STARCH-BASED MICROGEL AND PREPARATION METHOD THEREOF

(71) Applicant: Jiangnan University, Wuxi (CN)

(72) Inventors: Zhengyu Jin, Wuxi (CN); Yaoqi Tian, Wuxi (CN); Bao Zhang, Wuxi (CN); Han Tao, Wuxi (CN); Benxi Wei, Wuxi (CN); Xiuting Hu, Wuxi (CN); Chunsen Wu, Wuxi (CN); Xueming Xu, Wuxi (CN); Na Yang, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days. days.

(21) Appl. No.: 15/322,672

(22) PCT Filed: Aug. 4, 2015

(86) PCT No.: PCT/CN2015/085997
§ 371 (c)(1),
(2) Date: Dec. 28, 2016

(87) PCT Pub. No.: WO2017/020237
PCT Pub. Date: Feb. 9, 2017

(65) Prior Publication Data
US 2018/0056266 A1    Mar. 1, 2018

(51) Int. Cl.
*C08L 33/26*    (2006.01)
*B01J 13/00*    (2006.01)
*C08L 3/10*    (2006.01)

(52) U.S. Cl.
CPC ............ *B01J 13/0065* (2013.01); *C08L 3/10* (2013.01); *C08L 33/26* (2013.01); *C08L 2205/04* (2013.01)

(58) Field of Classification Search
CPC ...... A61K 8/8158; C08L 33/26; C08B 31/195
See application file for complete search history.

(56) References Cited

FOREIGN PATENT DOCUMENTS

| | | |
|---|---|---|
| CN | 102311945 A | 11/2012 |
| CN | 103755968 A | 4/2014 |
| CN | 1039922482 A | 8/2014 |
| CN | 103709343 A | 9/2014 |
| CN | 104403011 A | 11/2015 |
| WO | WO9957158 A1 | 11/1999 |

OTHER PUBLICATIONS

Murthy et al. (Reactive & Functional Polymers 2006;66:1482-1493).*
Li et al. (Biomacromolecules 2009;10:1931-1938).*

* cited by examiner

*Primary Examiner* — Ernst V Arnold
(74) *Attorney, Agent, or Firm* — Wang Law Firm, Inc.

(57) ABSTRACT

The present disclosure discloses a triple-responsive starch-based microgel and a preparation method thereof. The present disclosure prepares $C_6$ oxidized starch and PNIPAM semi-interpenetrating network microgel, namely the triple-responsive starch-based microgel, mainly with pH sensitive $C_6$ oxidized starch and temperature sensitive NIPAM (N-isopropylacrylamide) as raw materials, and using an inverse emulsion polymerization method. The triple-responsive starch-based microgel according to the present disclosure is a spherical particle with the particle diameter of 15-25 μm, has pH, temperature and ionic strength-sensitivity, good biocompatibility and biodegradability, and can be widely used in the fields of nutrient protection, controlled drug release, protein separation and purification and the like. Meanwhile, its preparation process is simple and controllable with mild reaction conditions, and is suitable for large-scale production.

12 Claims, No Drawings

TRIPLE-RESPONSIVE STARCH-BASED MICROGEL AND PREPARATION METHOD THEREOF

TECHNICAL FIELD

The present disclosure relates to a starch-based microgel, and, particularly to a triple-responsive starch-based microgel and a preparation method thereof, and belongs to the field of deep processing technology of starch.

BACKGROUND

Smart microgel means a microgel that is stimuli-responsive corresponding to changes of external stimuli (e.g.: temperature, pH, light, ionic strength, electric field or magnetic field, etc.). Depending on the source of raw materials, microgel can be divided into synthetic microgel and natural microgel. Most microgel is prepared from synthetic macromolecules, such as PMA, PVCL, PDEA, PAA, etc. However, such macromolecules have the defects, such as poor biodegradability, poor biocompatibility and certain toxicity. Microgels from natural polymers are more attractive because of their biodegradability, excellent biocompatibility, non-toxicity, and other strengths.

Besides, the research on a temperature sensitive microgel poly(N-isopropylacrylamide) (PNIPAM) is particularly remarkable. Its critical phase transition temperature is 32° C. or so. When the temperature is below its critical phase transition temperature, PNIPAM microgel will be highly swollen, while when the temperature is above its critical phase transition temperature, the microgel will be shrunken, and its swelling degree will suddenly drop. The microgel prepared with PNIPAM has typical temperature sensitivity. People look forward to preparing multifunctional microgel with a variety of stimuli-responsiveness. Therefore, preparing microgel with double sensitivity using the temperature-sensitive material PNIPAM in combination with the environmental sensitivity of other intelligent materials becomes a research hotspot. But at present, there is no report on microgel with multiple sensitivity based on natural macromolecules.

SUMMARY

The present disclosure mainly aims to provide a triple-responsive starch-based microgel and a preparation method thereof, so as to overcome the defects of the prior art.

In order to achieve the foregoing object of the present disclosure, the technical solution adopted in the present disclosure includes: a method for preparing a triple-responsive starch-based microgel, including: preparing $C_6$ oxidized starch and N-isopropylacrylamide semi-interpenetrating network microgel, namely the triple-responsive starch-based microgel, with pH sensitive $C_6$ oxidized starch and temperature sensitive poly(N-isopropylacrylamide) as raw materials, and using an inverse emulsion polymerization method.

According to a more preferred embodiment, the preparation method may further include:
(1) acquiring noncrystalline granule starch by processing aqueous ethanol of starch using a microwave field;
(2) acquiring $C_6$ oxidized starch through oxidization of a primary hydroxyl at the $C_6$ position of noncrystalline granule starch noncrystalline granule starch using TEMPO (2,2,6,6-tetramethyl-1-piperidinyloxy free radical), NaClO and NaBr mixture system;
(3) preparing an aqueous phase solution A, 100 ml deionized water of which contains 1-2 g of $C_6$ oxidized starch, 95-100 mmol of monomer N-isopropyl acrylamide, and 3-5 mmol of crosslinking agent N,N'-methylene-bis-acrylamide (BIS);
(4) in a protective atmosphere, slowly adding the aqueous phase solution A dropwise in an oil phase emulsion stirred at constant speed with the volume ratio of the aqueous phase solution A to the oil phase emulsion being 1:10-2:10. After the aqueous phase solution A is fully mixed with the oil phase emulsion, slowly adding an aqueous phase solution B containing an initiator and/or a catalyst dropwise, stirring for fully mixing, stirring at constant speed of 400-500 rpm at 0-3° C. for 12 h, then centrifuging at 5000 rpm for more than 10 min, removing the supernatant, repeatedly washing with deionized water, and then drying to constant weight.

More preferably, step (2) includes: preparing noncrystalline granule starch obtained from step (1) into an emulsion, adding TEMPO and NaBr, adding NaClO at 0° C., adding an alkaline material to keep the reaction medium at a pH of 10, 2-4 h later, slowly adding the reaction solution to ethanol for precipitation, and then obtaining the $C_6$ oxidized starch through filtration, washing and vacuum drying.

According to a more specific embodiment, step (2) specifically includes: adding 0.02-0.05 g of TEMPO and 0.4-0.5 g of NaBr to 100 mL of about 30 wt % noncrystalline granule starch at a controlled temperature of 0° C., then adding 60-75 mL of 20 wt % NaClO solution, adding alkaline solution dropwise, e.g. about 0.1 mol/L NaOH solution, to keep the reaction medium at a pH of 10 for 2-4 h, slowly adding the reaction solution to ethanol for precipitation, followed by filtration, washing, and vacuum drying at 40° C.

According to a more preferred embodiment, the preparation method may include: mixing a mixed surfactant mainly formed by Tween-80 and Span-80 at a volume ratio of 1-2:8-9 with n-hexane at a volume ratio of 2-5:995-998, stirring in a protective atmosphere at a rate of 400-500 rpm, and emulsifying at 25-30° C. for 2-4 h to obtain the emulsified oil phase.

According to a more preferred embodiment, the aqueous solution B is an aqueous solution containing an initiator, a catalyst and sodium trimetaphosphate.

Furthermore, the initiator may be preferably selected from, but is not limited to, ammonium persulfate.

Furthermore, the catalyst may be preferably selected from, but is not limited to, N,N,N',N'-tetramethylethylenediamine.

Furthermore, the noncrystalline granule starch has no crystallinity structure and good particle shape.

Furthermore, the $C_6$ oxidized starch is only oxidized at the $C_6$ position of the starch molecule with the oxidation degree being 80%-95%.

Furthermore, the preceding protective atmosphere may be an atmosphere of nitrogen, an inert gas (e.g. Ar), and the like.

The triple-responsive starch-based microgel prepared using any one of the foregoing methods is a spherical particle with a particle diameter of 15-25 μm, and has pH, temperature and ionic strength-sensitivity.

Compared with the prior art, the strengths of the present disclosure include:

(1) The triple-responsive starch-based microgel according to the present disclosure is a semi-interpenetrating network microgel based on $C_6$ oxidized starch and PNIPAM in the form of spherical particles with the particle diameter of 15-25 μm, has pH, temperature and ionic strength-sensitivity, good biocompatibility and biodegradability, is safe and non-toxic, and can be widely used in the fields of nutrient protection, controlled drug release, protein separation and purification and the like.

(2) The preparation process according to the present disclosure is simple and controllable with mild reaction conditions, and is suitable for large-scale production.

DESCRIPTION OF THE EMBODIMENTS

An aspect of the present disclosure relates to a method for preparing a triple-responsive starch-based microgel, including: preparing $C_6$ oxidized starch and PNIPAM (poly(N-isopropylacrylamide)) h semi-interpenetrating network microgel, with pH sensitive $C_6$ oxidized starch and temperature sensitive NIPAM (N-isopropylacrylamide) as raw materials, and using an inverse emulsion polymerization method.

According to a typical embodiment, the preparation method includes:
(1) preparation of noncrystalline granule starch
Noncrystalline granule starch is acquired by processing aqueous ethanol of starch using a microwave field;
(2) synthesis of $C_6$ oxidized starch
$C_6$ oxidized starch is acquired through oxidization of a primary hydroxyl at the $C_6$ position of noncrystalline granule starch using TEMPO/NaClO/NaBr system;
(3) preparation of oil phase emulsion
The oil phase emulsion composition and preparation may be any suitable type and method known in the industry; For example, an emulsified oil phase may be prepared by mixing a mixed surfactant formed by Tween-80 and Span-80 at a volume ratio of 1-2:8-9 with n-hexane or other organic solvent at a volume ratio of 2-5:995-998, stirring in a protective atmosphere, e.g. nitrogen, at a rate of 400-500 rpm, and emulsifying at 25-30° C. for 2-4 h;
(4) preparation of aqueous solution
Aqueous solution A (100 ml): 1-2 g of oxidized starch, 95-100 mmol of monomer NIPAM (N-isopropylacrylamide) and 3-5 mmol of crosslinking agent BIS (N,N'-methylene-bis-acrylamide) are dissolved in 100 mL of deionized water. Aqueous solution B: 2-5 mmol of initiator ammonium persulfate (APS), 0.5-0.8 mL of catalyst TEMED (N,N,N', N'-tetramethyl-ethylenediamine) and 0.2-0.4 g of sodium trimetaphosphate are dissolved in deionized water;
(5) Preparation of starch-based microgel using inverse emulsion polymerization method
In a protective atmosphere, e.g. nitrogen, the aqueous phase solution A is slowly added dropwise in an oil phase emulsion stirred at constant speed. After fully mixing, the aqueous phase solution B is slowly added dropwise while stirring for fully mixing, stirred at constant speed of 400-500 rpm at 0-3° C. for 12 h, then centrifuged at 5000 rpm or more for more than 10 min, repeatedly washed with deionized water after removing the supernatant, and then dried by vacuum drying to constant weight.

Another aspect of the present disclosure relates to the triple-responsive starch-based microgel which is prepared using the aforementioned method, has a spherical morphological structure, and has a particle size distribution of 15-25 μm. The volume of the micro-gel thus obtained is increased with the increase of the pH value in a pH range of 3-6, and the largest volume can be up to 105 times. Phase transition of the microgel arises at 34.5° C. When the ionic strength is less than 0.5 M, the microgel volume decreased with the increase of ionic strength, while when the ionic strength is more than 0.5 M, the microgel volume remains almost constant. That is, the starch-based microgel has pH, temperature and ionic strength-sensitivity.

The present disclosure synthesizes a starch-based microgel with pH-sensitive $C_6$ oxidized starch and heat sensitive NIPAM as raw materials using inverse emulsion polymerization method. The micro-gel thus obtained is characterized by biodegradability of natural macromolecule, excellent biocompatibility, nontoxicity, etc., has triple sensitivity, and has wide application prospects in the fields of nutrient protection, controlled drug release, protein separation and purification, etc.

The technical solution of the present disclosure is further illustrated in a number of typical embodiments below.

Embodiment 1

Ethanol solution of starch was obtained through dispersing 20 g of wax corn starch in 100 mL of 50% (mass fraction) ethanol solution, and was processed using a microwave field with the microwave power of 1000 W for 20 minutes to obtain noncrystalline granule starch; 0.02 g of TEMPO and 0.4 g of NaBr were added to 100 mL of 30% noncrystalline granule starch thus obtained present in a three-necked flask equipped with a stirrer, a dropping funnel and a thermometer, and were put in an ice-water bath to control the temperature. pH of the reaction medium was kept at 10 by adding 60 mL of 20% NaClO solution through the dropping funnel and adding 0.1 mol/L NaOH solution dropwise. 2-4 h later, the reaction solution was slowly added in ethanol for precipitation, filtered, washed, and dried by vacuum drying at 40° C., so that $C_6$ oxidized starch with 80% oxidation degree was obtained. 1 g of oxidized starch thus obtained, 95 mmol of monomer NIPAM and 3 mmol of crosslinking agent BIS were dissolved in 100 mL of deionized water, and fulled mixed to prepare aqueous solution A; 2 mmol of initiator ammonium persulfate (APS), 0.5 mL of catalyst TEMED and 0.2 g of sodium trimetaphosphate were dissolved in 10 mL of deionized water, and fully mixed to prepare aqueous solution B. 1000 mL of aqueous solution A was slowly added to n-hexane containing 0.4 mL of Tween-80 and 1.6 mL of Span-80, and stirred at 400-500/min for fully mixing, and then aqueous solution B was slowly added dropwise. After stirring for fully mixing, the system was stirred at constant speed of 400-500 rpm in an ice water bath for 12 h. After centrifuging at 5000×g for 10 min, the supernatant was removed, the remaining part was repeatedly washed with deionized water 10 times, and dried by vacuum drying to constant weight. The synthesized starch-based microgel is spherical with the particle size distribution of 15-23 μm, as observed under a high resolution TEM. The volume of the micro-gel thus obtained is increased with the increase of the pH value in a pH range of 3-6, and the largest volume can be up to 105 times. Phase transition of the microgel arises at 34.5° C. When the ionic strength is less than 0.5 M, the microgel volume decreased with the increase of ionic strength, while when the ionic strength is more than 0.5 M, the microgel volume remains unchanged. That is, the starch-based microgel has pH, temperature and ionic strength-sensitivity.

Embodiment 2

Ethanol solution of starch was obtained through dispersing 25 g of wax corn starch in 100 mL of 50% (mass fraction) ethanol solution, and processed using a microwave field with the microwave power of 1200 W for 30 minutes to obtain noncrystalline granule starch; 0.05 g of TEMPO and 0.5 g of NaBr were added to 100 mL of 30% noncrystalline granule starch thus obtained present in a three-necked flask equipped with a stirrer, a dropping funnel and a thermometer, and were put in an ice-water bath to control the temperature. pH of the reaction medium was kept at 10 by adding 75 mL of 20% NaClO solution through the dropping funnel and adding 0.1 mol/L NaOH solution dropwise. 4 h later, the reaction solution was slowly added in ethanol for precipitation, filtered, washed, and dried by vacuum drying at 40° C., so that $C_6$ oxidized starch with 95% oxidation degree was obtained. 1 g of oxidized starch prepared above, 95 mmol of monomer NIPAM and 3 mmol of crosslinking agent BIS were dissolved in 100 mL of deionized water, and fully mixed to prepare aqueous solution A; 2 mmol of initiator ammonium persulfate (APS), 0.5 mL of catalyst TEMED and 0.2 g of sodium trimetaphosphate were dissolved in 10 mL of deionized water, and fully mixed to prepare aqueous solution B. 1000 mL of aqueous solution A was slowly added to n-hexane containing 0.4 mL of Tween-80 and 1.6 mL of Span-80, and stirred at 400-500/min for fully mixing, and then aqueous solution B was slowly added dropwise. After stirring for fully mixing, the system was stirred at constant speed of 400-500 rpm in an ice water bath for 12 h. After centrifuging at 5000×g for 10 min, the supernatant was removed, the remaining part was repeatedly washed with deionized water 10 times, and dried by vacuum drying to constant weight. The synthesized starch-based microgel is spherical with the particle size distribution of 18-25 μm. The volume of the micro-gel thus obtained is increased with the increase of the pH value in a pH range of 3-6, and the largest volume can be up to 105 times. Phase transition of the microgel arises at 34.5° C. When the ionic strength is less than 0.5 M, the microgel volume is decreased with the increase of ionic strength, while when the ionic strength is more than 0.5 M, the microgel volume remains unchanged. That is, the starch-based microgel has pH, temperature and ionic strength-sensitivity.

It is necessary to indicate that in the Description, the terms "including", "contain" or any other variants thereof are intended to cover non-exclusive "including", so that the process, method, article or device including a series of elements include not only those elements, but also other elements that are not clearly listed, or further include inherent elements for this process, method, article or device. PS, those skilled in this art may make various other corresponding changes and modifications based on the technical solutions and technical ideas of the present disclosure, and all these changes and modifications should fall within the scope of protection of the Claims of the present disclosure.

The invention claimed is:
1. A method for preparing a triple-responsive starch-based microgel, comprising: preparing $C_6$ oxidized starch and N-isopropylacrylamide semi-interpenetrating network (IPN) microgel, namely the triple-responsive starch-based microgel, mainly with pH sensitive $C_6$ oxidized starch and temperature sensitive N-isopropylacrylamide as raw materials, and using an inverse emulsion polymerization method.
2. The method for preparing the triple-responsive starch-based microgel according to claim 1, comprising:
  (1) preparing ethanol solution of starch by dispersing starch in aqueous solution of ethanol with the massic volume ratio of starch to ethanol solution being 20-25 g/100 ml, and processing the ethanol solution of starch using a microwave field with the microwave power of 1000-1200 W for 20-30 minutes to obtain noncrystalline granule starch;
  (2) acquiring pH sensitive $C_6$ oxidized starch through oxidization of a primary hydroxyl at the $C_6$ position of noncrystalline granule starch using 2,2,6,6-tetramethyl-1-piperidinyloxy free radical, NaClO and NaBr mixture system;
  (3) preparing an aqueous phase solution A, 100 mL deionized water of which contains 1-2 g of pH sensitive $C_6$ oxidized starch, 95-100 mmol of temperature sensitive monomer N-isopropyl acrylamide, and 3-5 mmol of crosslinking agent N, N'-methylene-bis-acrylamide;
  (4) in a protective atmosphere, slowly adding the aqueous phase solution A dropwise to an oil phase emulsion stirred at constant speed with the volume ratio of the aqueous phase solution A to the oil phase emulsion being 1:10-2:10, and after the aqueous phase solution A is fully mixed with the oil phase emulsion, slowly adding an aqueous phase solution B containing an initiator and/or a catalyst dropwise, stirring for fully mixing, stirring at constant speed of 400-500 rpm at 0-3° C. for 12 h, then centrifuging at 5000 rpm or more for more than 10 min, removing the supernatant, repeatedly washing with deionized water, and then drying to constant weight.
3. The method for preparing the starch-based microgel according to claim 2, wherein, the starch comprises any one or a combination of two or more of wax corn starch, potato starch, cassava starch and wheat starch.
4. The method for preparing the triple-responsive starch-based microgel according to claim 2, wherein, step (2) specifically comprises: preparing noncrystalline granule starch obtained from step (1) into an emulsion, adding TEMPO and NaBr, adding NaClO at 0° C., and adding an alkaline material to keep the reaction medium at a pH of 10, 2-4 h later, slowly adding the reaction solution to ethanol for precipitation, and then obtaining the $C_6$ oxidized starch through filtration, washing and vacuum drying.
5. The method for preparing the triple-responsive starch-based microgel according to claim 2, comprising: mixing a mixed surfactant mainly formed by Tween-80 and Span-80 at a volume ratio of 1-2:8-9 with n-hexane at a volume ratio of 2-5:995-998, stirring in a protective atmosphere at a rate of 400-500 rpm, and emulsifying at 25-30° C. for 2-4 h to obtain oil phase emulsion.
6. The method for preparing the triple-responsive starch-based microgel according to claim 2, wherein, the aqueous solution B is an aqueous solution containing an initiator, a catalyst, and sodium trimetaphosphate.
7. The method for preparing the triple-responsive starch-based microgel according to claim 6, wherein, the initiator comprises ammonium persulfate.
8. The method for preparing the triple-responsive starch-based microgel according to claim 6, wherein, the initiator comprises N, N, N',N'-tetramethyl-ethylenediamine.
9. The method for preparing the triple-responsive starch-based microgel according to claim 2, wherein, the noncrystalline granule starch has a crystallinity of zero and has good particle morphology.
10. The method for preparing the triple-responsive starch-based microgel according to claim 1, wherein, the $C_6$ oxidized starch is only oxidized at the $C_6$ position of the starch molecule with the oxidation degree being 80%-95%.
11. The triple-responsive starch-based microgel prepared using the method according to claim 1, wherein, the gel is a spherical particle with a particle diameter of 15-25 μm, and has pH, temperature and ionic strength-sensitivity.
12. The triple-responsive starch-based microgel according to claim 11, wherein, the volume of the micro-gel is increased with the increase of the pH value in a pH range of 3-6, the largest volume is 105 times that of the initial volume, phase transition of the microgel arises at 34.5° C., and when the ionic strength is less than 0.5M, the microgel volume is decreased with the increase of ionic strength, while when the ionic strength is more than 0.5M, the microgel volume remains unchanged.

\* \* \* \* \*